Nov. 12, 1946.    R. F. BRENNEN    2,410,807
CO-ORDINATED-CAM COLLET ACTUATOR
Filed April 3, 1943    2 Sheets—Sheet 2
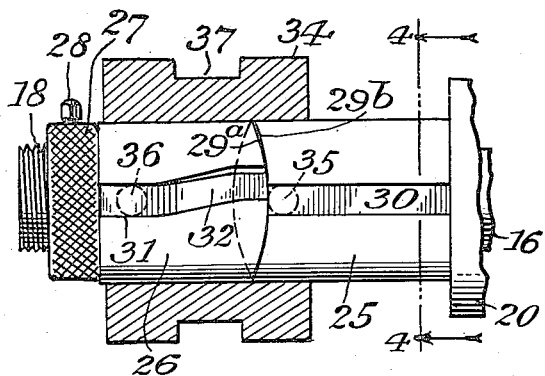
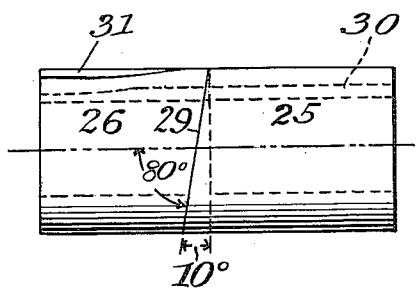
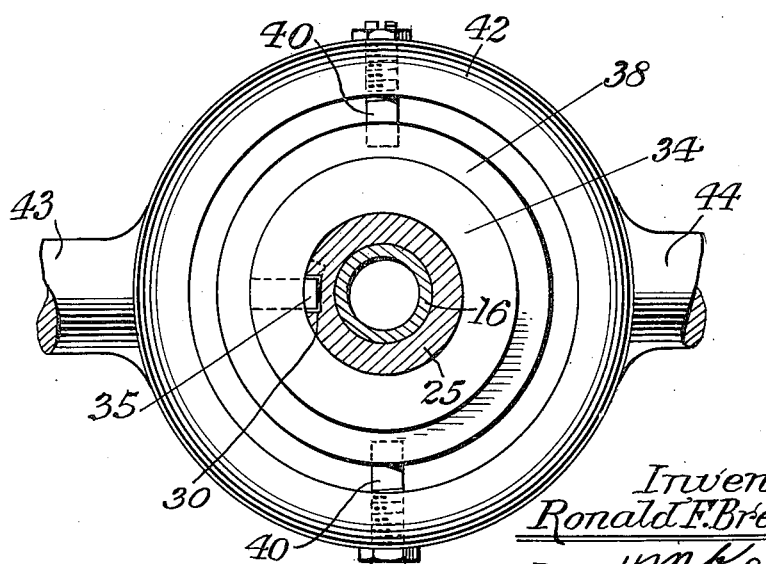
Inventor,
Ronald F. Brennen,
by H. M. Kilpatrick
Attorney.

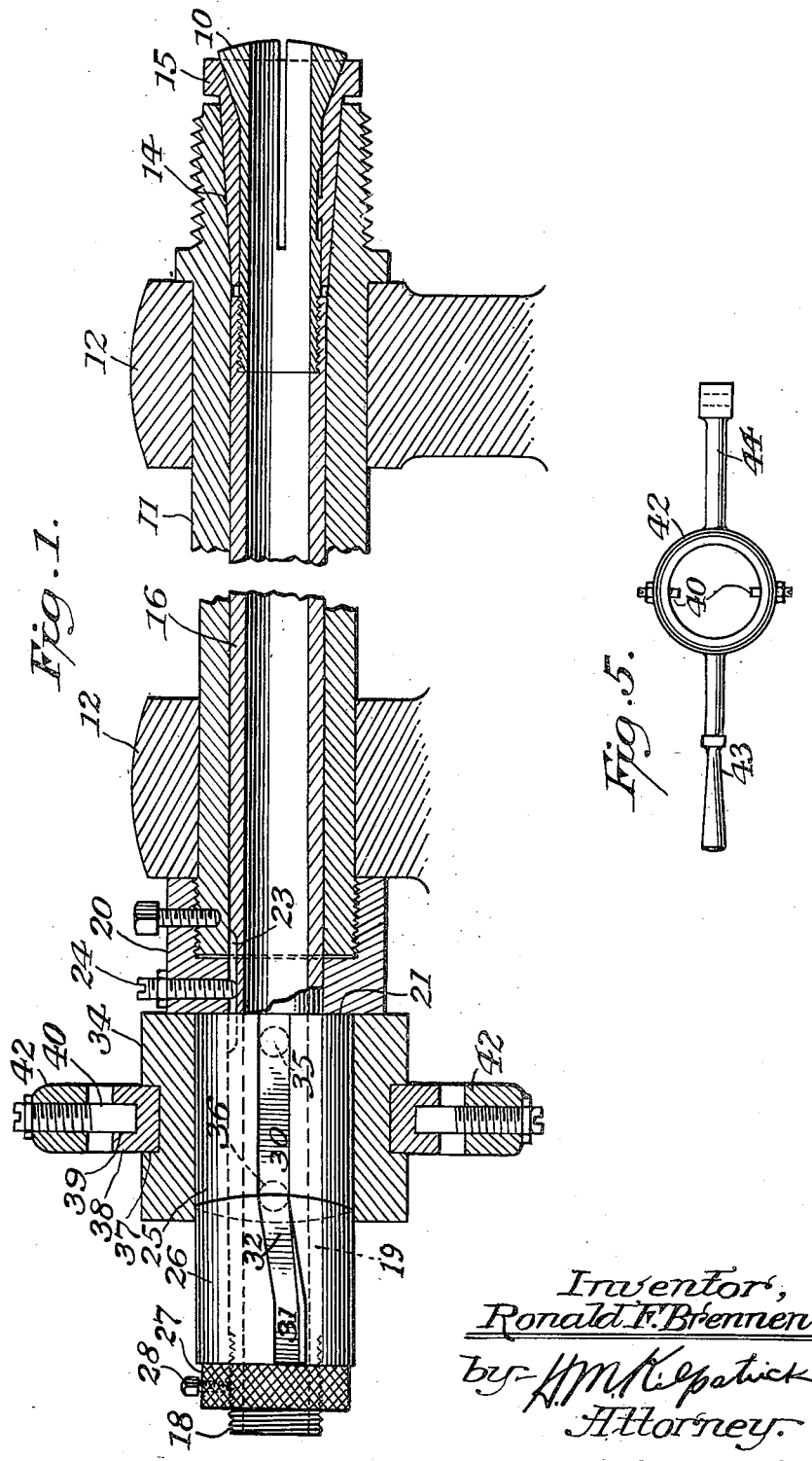

Patented Nov. 12, 1946

2,410,807

UNITED STATES PATENT OFFICE 2,410,807

CO-ORDINATED-CAM COLLET ACTUATOR

Ronald F. Brennen, Valley Stream, N. Y., assignor to General Die-Stamping-Tool Company, New York, N. Y., a partnership comprised of Richard P. Matshak and David M. Kasson Application April 3, 1943, Serial No. 481,768

15 Claims. (Cl. 279—1)

1

This invention relates to actuators for clamping means and more particularly to apparatus for actuating collets on lathes.

Objects of the invention are to provide an improved strong, rugged device or apparatus of this kind which operates with a minimum of friction when opening and closing the collet and when the collet is closed and the lathe is running.

Other objects of the invention are to provide an improved device of this kind which has few parts, and which may be constructed with a minimum of machine work.

Additional objects of the invention are to effect simplicity and efficiency in such actuators and to provide an extremely simple device of this kind which is strong, durable, and reliable in operation, and economical to manufacture and install.

Still other objects of the invention will appear as the description proceeds; and while herein details of the invention are described in the specification and some of the claims, the invention as described in some of the broader claims is not limited to these, and many and various changes may be made without departing from the scope of the invention as claimed in the broader claims.

The inventive features for the accomplishment of these and other objects are shown herein in connection with the actuator shown, by way of example, as carried by a lathe spindle. The drawings briefly stated, show the tubular spindle of the head stock of a lathe supporting a collet in one end of the spindle and a draw tube in the spindle having operative connection with the collet and having a projecting rear end.

My actuator briefly stated includes a tension-adjusting collar adjustably secured on said rear end, and cam collars on said projecting end fitting between the adjusting collar and the spindle and having cam meeting faces. The cam collars are respectively provided with substantially longitudinal grooves, the groove of one collar being at least in part disposed at an angle to the groove in the other collar. A releasing collar slidable on said cam collars and provided with radial pins engaged in said grooves respectively is provided with a peripheral groove therearound in which is received a floating collar engaged by diametrically opposite pins carried by a lever, for sliding said releasing collar to relatively rotate, and therefore separate, the cam collars and then operate the collet.

In the accompanying drawings showing, by way of example, one of many possible embodiments of the invention,

2

Fig. 1 is a fragmental axial vertical sectional view partly in elevation showing the actuator applied to a lathe-spindle-carried collet in open position;

Fig. 2 is a fragmental axial sectional view partly in elevation showing the actuating cams in position to hold the collet closed;

Fig. 3 is a fragmental transverse sectional view partly in elevation showing the actuating means, with the cam collars in position to close the collet;

Fig. 4 is a side elevation of the cam collars in relative position to close the collet;

Fig. 5 is a side elevation of the actuating lever on a reduced scale.

My improved actuator is shown in combination with a collet 10, carried by the head stock spindle 11 of the head stock 12 of a lathe, the spindle having an inner taper 14 receiving the collet sleeve 15 receiving the collet 10 having threaded connection with the draw-in or draw tube 16 having a sliding fit in the spindle and having projecting rear end 18, 19 threaded at its extreme end portion 18 only, leaving a smooth portion 19. A rod, shaft or other work piece may be fed through the tube to the collet.

A torque-tube guide-collar 20 secured fast on the rear end of the spindle 10 and having an abutment face 21 receives the tube 16 with a sliding fit. The tube is provided with a longitudinal seat 23 receiving the end of a radial pin 24 carried in the collar to prevent relative rotation between the tube and collar 20 and therefore the spindle.

The actuator includes inner and outer coordinate cam-collars 25 and 26 received on the smooth projecting rear end portion 19 of the tube 16 and held in place by a knurled tension-adjusting collar 27 having adjustable threaded connection with the rear end of the tube and carrying therein a set screw 28 to hold the adjusting collar in adjusted position, thus holding the cam collars 25 and 26 against each other and the tube-guide collar 20 and serving to adjust the tension of the collet when closed on the work piece.

The adjacent faces 29a, 29b (Fig. 2) of said cam collars meet in a plane 29 (Fig. 3) at an angle of about 80 degrees to their axis, when the collet is open, whereby relative rotation of the cam collars pushes the cam collars apart and pushes the adjusting collar 27 in a direction away from the guide collar 20 and thereby draws the collet within its sleeve and clamps the collet on the work piece therein with a tension determined by the adjusted position of the adjusting collar 27, said faces at the plane 29 contacting throughout at the released position of the collet.

One of said cam collars preferably the inner collar 25 has in its periphery a straight longitudinal groove 30; while the other cam collar 26 has an approximately similar approximately longitudinal groove 31, 32 longitudinally straight at the part 31 remote from the other groove 30 and having a spiral part 32 connecting said straight part 31 with the other groove 30 when the collet is in released position.

A releasing collar 34 having a longitudinally slidable fit on said cam collars is provided with a pair of longitudinally alined sliding pins engaged in said grooves respectively with an accurate fit, one of the pins remaining in the straight groove 30 the other pin moving to and from said straight part 31 from and to the juncture of the grooves 30, 32, as the releasing collar slides.

Said releasing collar has a peripheral bearing groove 37 disposed therearound in which is rotatably received a floating collar 38 and provided with diametrically disposed bearing bores 39 receiving diametrically disposed pins 40 carried by a large annular intermediate portion 42 of an actuating lever 42, 43, 44 having a handle 43 at one end and a fulcrumed part 44 at the other end pivoted for movement on a vertical axis on a suitable bracket on the frame of the lathe, as is well known, whereby the lever may be laterally moved to slide said releasing collar and consequently said pins 35, 36 thereby to relatively rotate the cam collars 25, 26 thereby to slide the tube 16 to open the collet or close it on the work piece.

When the lever is moved outwardly, the pin 35 slides in the straight groove 30, while the pin 36 rides from the spiral groove part 32 to the straight part 31, relatively moving the collars to the position of Fig. 2 forcing the cam collars apart and drawing the collar into its sleeve for clamping the work piece; in this position the end face at 29a on the outer cam is engaged by the pin to limit the outward movement of the releasing collar and lever.

The operation of the actuator will be easily understood from the foregoing.

When the lever handle is moved to its position nearest the operator the releasing collar 34 becomes disposed against the guide-collar 20, and the cam collars take the position of Figs. 1 and 3, allowing the draw tube 16 and collet to move rightward as in Fig. 1, thus releasing the collet from the work piece (not shown). In this position the pin 36 bridges the meeting plane 29, and the cam collars are locked against relative rotation.

When it is desired to close the collet the lever handle 43 is moved leftward of Fig. 1, consequently moving leftward the floating collar 38 and releasing collar 34, thus causing the pin 36 to ride through the spiral groove-part 32 into the straight groove-part 31, as in Fig. 2, while the pin 35 rides along the straight groove 30. This causes relative rotation between the cam collars causing corresponding parts of the contacting faces 29a, 29b at the plane 29 as in Fig. 1, to be slightly offset from each other, thus forcing the adjusting collar 27, the tube 16 and the collet leftward of Fig. 1, clamping the collet on the work piece.

In this clamped position an edge of the groove part 32 is disposed opposite to the axis of the groove 30, thus forming a stop to limit outward movement of the pin 35 and the releasing collar.

As shown by Fig. 2, the amount of relative rotation between the cam collars is small. Consequently the amount of separation effected between faces 29a and 29b (Fig. 2) is slight; but this is enough to effect sufficient closure of the collet, since the adjusting collar 27 may be adjustably secured in proper place to effect this result.

The non-rotary floating collar 38 fits in the groove 37 sufficiently loosely to allow at all times free rotation of the releasing collar and all parts carried by it and the tube 16 as the spindle rotates; and the collet may be clamped or unclamped whether the spindle is rotating or not.

The invention claimed is:

1. The combination, with a lathe head-stock having therein a live spindle having an inner taper at the work end and a short projecting threaded rear portion; an attachment comprising a collet in the taper; a draw-tube slidably fitting in the spindle and connected to the collet and having a projecting rear end and a longitudinal seat near said threaded portion; a guide collar slidably receiving the tube and having inner threads received on and removably secured fast on said threaded portion, and having a transverse abutment faced away from the stock; a radial pin carried by the guide collar and engageable in said seat; a tension-adjusting collar adjustably removably secured on said rear end; cam collars rotatably and slidably received on said projecting end between the adjusting collar and said abutment face and having contacting faces meeting at an angle to their axes; said cam collars having approximately longitudinally grooves disposed at an angle to each other; a releasing collar slidable on said cam collars and provided with radial pins engaged in said grooves respectively; and means to slide said releasing collar to relatively rotate the cam collars; removal of the tension-adjusting collar allowing the easy removal of the entire attachment from the stock and replacement of the usual end collar on said threaded rear portion.

2. In combination, a head stock; tubular spindle therein having a projecting rear threaded portion; a collet in one end of the spindle; a tube in the spindle having operative connection with the collet and having a projecting rear end; a tension-adjusting collar removably secured on said rear end; a guide collar having inner threads received on and removably secured fast on said threaded portion and having a transverse abutment face extending to the tube; inner and outer coordinate cam collars slidably, rotatably and removably received on said projecting end between the adjusting collar and said abutment face and respectively having cylindrical outer faces of the same diameter; the contacting faces of said cam collar being plane faces meeting at an angle to the axis of the collar; said collars having in their peripheral faces approximately longitudinal grooves at an angle to each other; a releasing collar slidable on said cam collars and provided with radial pins engaged in said grooves respectively; said releasing collar having a peripheral groove therearound; a floating collar in said bearing groove; and means to slide said floating collar to relatively rotate the cam collars and operate the collet; both of said grooves of the collar being open at both ends to facilitate manufacture and to permit the easy removal and assembly of the bearing collar when the collars are assembled on the tube.

3. A removable attachment for a head stock having therein a tubular spindle; said attachment comprising a collet in the work end of the spindle; a draw tube in the spindle having operative connection with the collet and having a projecting rear end; a tension-adjusting collar adjustably secured fast on said rear end; cam collars of the same diameter on said projecting end removably fitting between the adjusting collar and the spindle and having cam meeting faces and having approximately longitudinal grooves respectively disposed at an angle to each other; a releasing collar slidable on said cam collars and provided with radial pins engaged in said grooves respectively; said releasing collar having a peripheral groove therearound; and a floating collar in said bearing groove adapted to be operatively connected with an operating means sliding said floating collar to relatively rotate the cam collars and operate the collet; both of said grooves having straight parts; said pins being so positioned in the collar that when the bearing collar is disposed at one limit, a diameter of a pin will be substantially coincident with the plane of said meeting faces and the cam collars will be locked by such pin, and when the bearing collar is at its other limit, the pins will be in the straight parts with the inner pin against the outer cam collar to hold the bearing collar against outward movement and the collars against relative rotation with the collet in the closed position.

4. An attachment as in claim 3 both of said grooves of the collar being open at both ends to facilitate manufacture and to permit the easy removal and assembly of the releasing collar when the collars are assembled on the tube.

5. An attachment as in claim 3 removal of the tension-adjusting collar allowing the easy removal of both cam collars and the entire attachment from the lathe.

6. In combination, a tubular spindle provided with an abutment face at the rear end; a collet in the work end of the spindle; a draw tube in the spindle having operative connection with the collet and having a projecting rear end; a tension-adjusting collar adjustable on said rear end; cam collars on said projecting end fitting between the adjusting collar and the spindle and having contacting faces, said faces having plane faces meeting at an angle to the axis of the collars, the inner cam collar having in its periphery a substantially straight longitudinal groove extending to the ends of the collar; the outer cam collar having a similar approximately longitudinal groove extending through the ends of the collar and being longitudinal having a substantially straight part remote from the groove of the inner collar when the collet is in released position; an interiorly smooth releasing bearing collar having a slidable fit on said cam collars and provided with a pair of longitudinally alined radial pins slidable in said grooves respectively with an accurate fit, and adapted when the releasing collar slides to relatively rotate the cam collars; manual means for at will sliding said releasing collar back and forth and consequently said pins, thereby to relatively rotate the cam collars thereby to open or close the collet; said pins being so positioned in the releasing collar that when the releasing collar engages said abutment face, a diameter of the outer pin will be substantially coincident with the plane of said plane faces and the cam collars will be locked by said outer pin with collet in released position, and when the bearing collar is in outer position, the pins will be in said straight part and straight groove with the inner pin against the outer cam collar to hold the bearing collar against outward movement and the collars against relative rotation with the collet in closed position.

7. An attachment for a stock having a tubular live spindle, said attachment comprising clamping means mounted on the spindle; a longitudinal element carried in the spindle and having a projecting rear part and having operative connection with the clamping means; an abutment fast on said rear part; annular cam structures relatively rotatable on said rear part between said abutment and the main part of the spindle and having cammed meeting faces transverse to the spindle axis; an elongated annular releasing structure rotatably and longitudinally movably supported around both of the cam structures; and a device to longitudinally slide such releasing structure; adjacent structures at each end of the elongated structures being respectively provided with a groove in one structure and a projection on the other structure engaging in the groove; said grooves being approximately longitudinal to said axis and at an angle to each other; said projections and grooves being so positioned relative to the structures that when the releasing structure is at one position of movement, one of said projections will be intersected by the plane of said meeting faces and the cam structures will be relatively locked by such projection.

8. An attachment for a stock having a tubular live spindle, said attachment comprising a collet mounted on the spindle; a longitudinal element carried in the spindle and having operative connection with the collet; an abutment adjustably fast on said element; annular structures on said element between said abutment and the main portion of the spindle and having cammed meeting faces transverse to the spindle axis; each of said structures at the periphery having a groove disposed approximately longitudinal to said axis, the groove of one structure being at an angle to the groove of the other structure, a releasing collar longitudinally and rotatively movably supported around said structures and having projections engaged in said grooves; and means to slide such releasing collar; said projections being so positioned in the releasing collar that when the releasing collar is at one limit of its movement, one of said projections will be intersected by the planes of said meeting faces and the structures will be locked against relative rotation by such projection.

9. An attachment for a stock having a tubular live spindle, said attachment comprising a collet mounted on the spindle; a tube carried in the spindle and having operative connection with the collet; an abutment fast on said tube; cam collars movable on said tube and adapted to fit between said abutment and spindle and having cammed meeting faces transverse to the axis of the tube; each of said cam collars at the periphery having a groove disposed approximately longitudinal to the axis of said collars, the groove of one collar being at an angle to the groove of the other collar, each groove having a straight part parallel to said axis; a releasing collar longitudinally slidably supported on the cam collars and having projections engaged in said grooves; and means to slide such releasing collar; said projections being so positioned in the releasing collar that when the releasing collar is at one limit of movement the projections will be in said straight part of each collar.

10. An attachment for a stock having a tubular live spindle, said attachment comprising a collet mounted on the spindle; a tube carried in the spindle and having operative connection with the collet; an abutment fast on said tube; cam collars movable on said tube and adapted to fit between said abutment and spindle and having cammed meeting faces transverse to the axis of the tube; each of said cam collars at the periphery having a groove disposed approximately longitudinal to the axis of said collars, the groove of one collar being at an angle to the groove of the other collar, said grooves having straight parts, a releasing collar longitudinally slidably supported on the cam collars and having pins engaged in said grooves; and a device to slide such releasing collar; said pins being so positioned in the releasing collar that when the releasing collar is at one limit of its movement, a diameter of one pin will be substantially coincident with the plane of said meeting faces and the cam collars will be locked by such pin, and when the releasing collar is at its other limit of movement the pins will be in said straight parts with the inner pin against the outer cam to hold the bearing collar against outward movement and to hold the collars against relative rotation and to hold the collet in closed position.

11. An article of sale comprising an attachment for a stock having a tubular live spindle having a projecting rear end, said attachment comprising a collet mounted in the spindle; a tube carried in the spindle and having a longitudinal groove and detachably connected with the collet; an abutment detachably fast on said tube; a guide collar detachably mounted on said projecting rear end; a set screw radial in the collar and loosely engaged in the groove; cam collars movable on said tube and adapted to fit between said abutment and guide collar and having cammed meeting faces transverse to the tube; a releasing collar supported on both of said cam collars and slidable longitudinally of the cam collars; a device attached to such releasing collar to slide the latter; and means carried by said releasing and cam collars and adapted to relatively rotate the collars when said releasing collar slides; said article of sale being adapted to be assembled for sale and shipping with said guide collar and abutment secured on the tube and holding the cam collars on the tube with the cam collars holding and supporting the releasing collar holding said device thereon.

12. An attachment for a stock having a tubular live spindle, said attachment comprising a collet mounted in the spindle; a tube carried in the spindle and detachably connected with the collet; an abutment fast on said tube; cam collars movable on said tube and adapted to fit between said abutment and spindle and having cammed meeting faces transverse to the tube; a releasing collar supported on both of said cam collars and slidable longitudinally of the cam collars; a device to slide such releasing collar; and means carried by said releasing and cam collars and adapted to relatively rotate the collars; said cam collars being at all times out of contact with and rotatable relative to the spindle; said tube with the abutment and cam collars thereon and the releasing collar and means on the collars comprising an assembly completely removable from and replaceable on the spindle while completely assembled, when the collet is detached from the tube.

13. An attachment for a stock having a tubular live spindle having a projecting rear end, said attachment comprising a collet mounted in the spindle; a tube carried in the spindle and detachably connected with the collet; an abutment fast on said tube; a guide collar detachably mounted fast on said rear end and having a transverse abutment face extending to the tube; cam collars movable on said tube and adapted to fit between said abutment and abutment face and having cammed meeting faces transverse to the tube; a releasing collar supported on both of said cam collars and slidable longitudinally of the cam collars; a device to slide such releasing collar; and means carried by said releasing and cam collars and adapted to relatively rotate the collars when the releasing collar slides; the assembly comprising said tube with the guide collar, abutment and cam collars thereon and the releasing collar and means on the cam collars, being removable from and replaceable on the spindle while assembled when the collet is detached from the tube and the guide collar is detached from the spindle.

14. In combination, a stock having a tubular live spindle having a threaded rear end; a collet mounted in the spindle; a tube carried in the spindle and detachably connected with the collet; a guide collar having internal threads received on said threaded end and provided with an abutment face; an abutment detachably fast on said tube; cam collars movable on said tube and adapted to fit between said abutment and guide collar and having cammed meeting faces transverse to the tube; a releasing collar supported on, and slidable longitudinally on, both of said cam collars; a device to slide such releasing collar; and means carried by said releasing and cam collars and adapted to relatively rotate the collars; said cam collars being at all times disconnected from and unattached to the guide collar; said tube with the abutment and cam collars thereon and the releasing collar and means on the cam collars comprising an assembly removable from and replaceable on the spindle when the abutment means is detached from the tube.

15. An article of sale comprising a cam collar having a cylindrical outer face of constant diameter; the end face of said cam collar being a plane face disposed at an angle to the axis of the collar; the cam collar having an approximately longitudinal groove extending through both ends of the collar and having substantially straight longitudinal parts at the respective ends and a helical part therebetween; said groove of the collar being open at both ends to facilitate manufacture and to permit the easy removal and assembly of the attachment of which it is a part.

RONALD F. BRENNEN.